No. 742,332. Patented October 27, 1903.

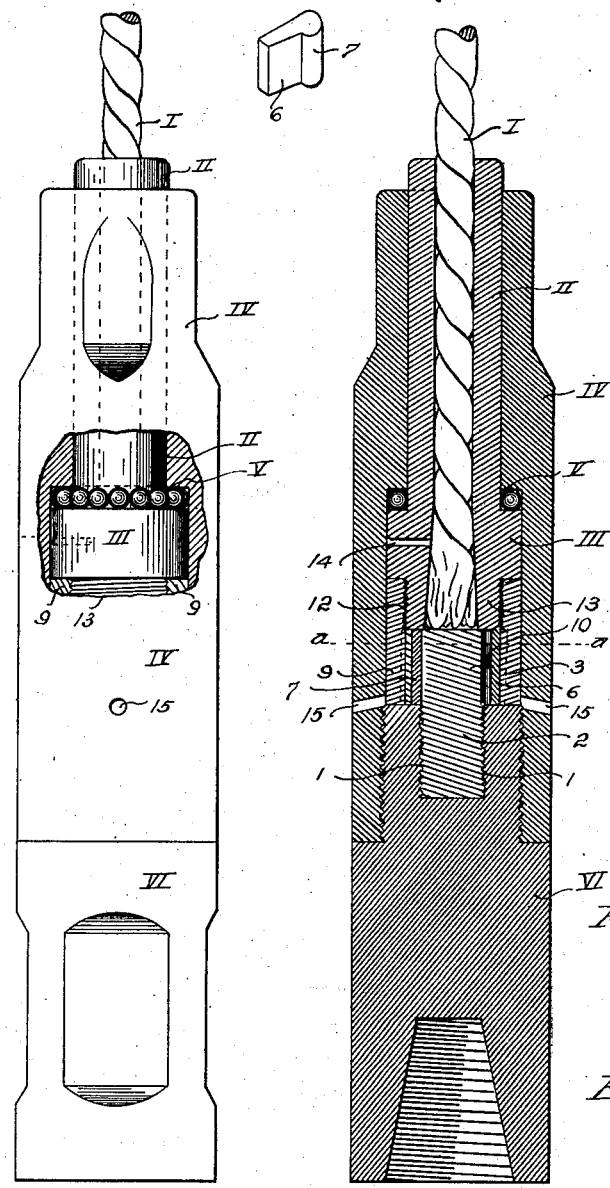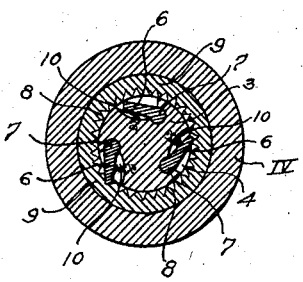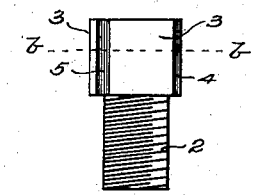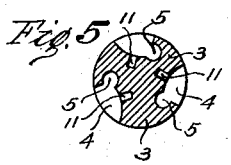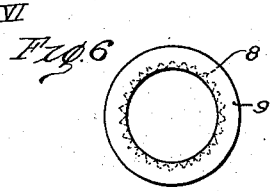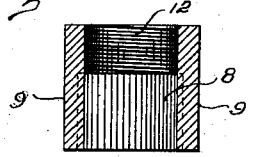

UNITED STATES PATENT OFFICE.

JOHN KUNNY, HENRY GRANT ARUNDELL, AND PETER R. KUNNY, OF LOS ANGELES, CALIFORNIA.

RATCHET-CLUTCH FOR DRILLING-SWIVELS.

SPECIFICATION forming part of Letters Patent No. 742,332, dated October 27, 1903.

Application filed April 11, 1903. Serial No. 152,234. (No model.)

*To all whom it may concern:*

Be it known that we, JOHN KUNNY, HENRY GRANT ARUNDELL, and PETER R. KUNNY, citizens of the United States, residing at Los Angeles, in the county of Los Angeles and State of California, have invented a new and useful Ratchet-Clutch for Drilling-Swivels, of which the following is a specification.

Our invention relates to improvements in ratchet-clutches for drilling-swivels in which pawls connected with one member of the swivel act upon ratchet-teeth connected with the other, so as to impart to the drilling-tool an intermittent progressive turning motion in driving wells; and the object of our invention is to provide a clutch that is positive in action under all conditions of drilling and one which is durable and simple of construction.

In the accompanying drawings, Figure 1 is a side elevation, partly in section, of a form of drilling-swivel with which our invention may be combined. Fig. 2 is a central longitudinal sectional view of the ratchet-clutch in combination with the drilling-swivel. Fig. 3 is a horizontal sectional view of Fig. 2 on the line *a a*. Fig. 4 is a side elevation of the pawl-hub. Fig. 5 is a horizontal sectional view of Fig. 4 on the line *b b*. Fig. 6 is a top view of the ratchet-barrel. Fig. 7 is a central longitudinal sectional view of the ratchet-barrel, and Fig. 8 is an enlarged view in perspective of the pawl and its bearing-pin.

Similar characters indicate similar parts throughout the different views.

To the lower end of a drilling-cable I is attached a swivel-rod II, with it head III, of larger diameter, turning in a cylindrical hollow casing IV, which casing is provided with an interior shoulder V, between which and the said head III may be interposed a series of bearing-balls to reduce friction. To the lower interiorly-threaded end of the casing IV may be screwed a short piece of tool-rod VI, forming a connection between the swivel and an ordinary drill-stem used in well-driving.

In the upper end of the connecting-piece of tool-rod VI may be formed a cylindrical threaded socket 1, which receives the correspondingly exteriorly threaded lower projection 2 of a pawl-hub 3, in the periphery of which are wide longitudinally-extending grooves 4, each forming a working space for a pawl and having formed therein at one side a tubular bearing-socket 5. In each of said grooves 4 and its socket 5 is accommodated a pawl 6, having at its base and integral with it a bearing-pin 7, which latter moves and is held in the said bearing-socket 5. The said bearing-pin is sufficiently inclosed in the said socket to be held properly and yet to allow the thinner pawl 6 sufficient reciprocatory motion, so that its free end may easily glide over and fall into the angular depressions between the ratchet-teeth 8 in the inner surface of the ratchet-barrel 9, in which the pawl-hub 3 loosely turns. A spiral spring 10, seated in a socket 11 in the side of each pawl-groove 4 and thence projecting against the inner side of the pawl 6, serves to force the free end of the said pawl into the angular depressions between the ratchet-teeth 8.

It is to be noted that the pawls 6 are in all respects alike and similarly disposed, except that they are arranged on their bearings at different and graduated intervals on the periphery of the hub 3, so that but one of them engages with the ratchet-barrel at one time. This arrangement is shown in detail in Fig. 3, where one of the three pawls is seen engaged against the bearing-face of one of the ratchet-teeth 8, while the other two pawls are, respectively, one up one-third and the other two-thirds of the side of their respective ratchet-teeth. The bearing-faces of the ratchet-teeth 8 are inclined, so that each engages approximately at right angles with the pawls 6.

In the elongated upper end of the ratchet-barrel 9 is an interior thread 12, by which it may be screwed to a lower threaded projection 13 of the swivel-head III.

The (wire) drilling-cable I may pass through the center of the swivel-rod II and can be socketed in the head III and its projection 13, the hole 14 serving for pouring melted Babbitt metal into the socket to rigidly fix the cable I.

At the lower edge of the clutch-box, formed by the elongation of the swivel-casing IV between the swivel-head III and the connecting tool-rod VI, may be bored vent-holes 15 through the swivel-casing IV.

In operation the cable I, being composed of separate twisted strands, lengthens and unravels more or less upon the raising of the drill-tools suspended from its lower end. In unraveling it turns with it the swivel-rod II and the ratchet-barrel 9, and as one of the ratchet-teeth 8 will now bear against the free end of a pawl 6, set in the pawl-hub 3, the parts connected with the latter, including the drill, are thus made to partake of this turning motion. The delivery of a stroke relieves for a moment the strain on the cable I, and it immediately springs back toward its normal twist, but now turning with it only the swivel-rod II and the ratchet-barrel 9, as the pawls 6 slip easily over the ratchet-teeth 8. As the up-and-down action of the drilling apparatus is quite abrupt and causes an equally abrupt torsional action in the cable I, the swivel alone, although effective in relieving the torsional strain upon said cable, becomes ineffective in turning the drilling-tools, which always are of considerable weight, to produce a round and straight hole. The same cause makes a clutch for the drilling-swivel unsatisfactory which does not set or engage at once as the cable begins to turn the swivel-pin, as it is evident that lost motion will cause the clutch to engage with a blow, the effect of which is more to break or crush the parts of the clutch at the points of impact than to turn the drill. In our improvement lost motion is reduced to a minimum, and thus the full torsional energy of the cable I utilized to produce turning motion in the drill by the graduated arrangement of the pawls 6 upon the pawl-hub 3, the proper inclination of the bearing-faces of the ratchet-teeth 8, and, lastly, by the pin and tubular socket-bearings of the pawls 6, which bearing is peculiarly adapted to resist the wearing effect of the severe shocks to which it is subjected. It will further be noted that the ratchet-clutch may be of a considerable vertical height, so as to provide large bearing-surfaces, as shown in the drawings.

Having thus described our invention, what we claim as new, and desire to secure by Letters Patent, is—

1. A drilling-spindle comprising a swivel-rod, a cable secured thereto, a head on the rod, a casing inclosing the rod and head, antifriction means located between the rod and casing, a ratchet-barrel secured to the rod and turning therewith, a tool-rod secured to the casing beneath the ratchet-barrel, a pawl-hub secured to the tool-rod, and means carried by the pawl-hub adapted to intermittently engage the ratchet-barrel.

2. A drilling-spindle comprising a swivel-rod to which a cable is secured, a casing surrounding the swivel-rod and movable with respect thereto, a ratchet-barrel, secured to the swivel-rod, a tool-rod secured to the casing and movable therewith, a pawl-hub carried by the tool-rod and means mounted in the pawl-hub for intermittently engaging the ratchet-barrel.

3. A drilling-spindle comprising a swivel-rod to which a cable is secured, a casing surrounding the swivel-rod and movable with respect thereto, a ratchet-barrel, secured to the swivel-rod, a tool-rod secured to the casing and movable therewith, a pawl-hub carried by the tool-rod and means mounted in the pawl-hub for intermittently engaging the ratchet-barrel, the casing provided with vent-apertures.

4. A drilling-spindle comprising a hollow casing, an internal shoulder formed therein, the lower end of the casing being internally threaded, a tool-rod having an external shoulder formed thereon, the upper end of the tool-rod being threaded and received in the lower end of the casing, and coöperating clutch members carried by the tool-rod and the swivel-rod, respectively, the clutch members inclosed within the outer casing.

5. A drill-spindle comprising a swivel-rod, a casing inclosing the swivel-rod, a tool-rod secured to the casing, and provided with a socket, a pawl-hub received in the socket, a ratchet-barrel secured to the swivel-rod and means carried by the pawl-hub to intermittently engage the ratchet-barrel.

In testimony whereof we have signed our names to this specification in the presence of two subscribing witnesses.

JOHN KUNNY.
HENRY GRANT ARUNDELL.
PETER R. KUNNY.

Witnesses:
WALLACE W. COOPER,
W. B. WINGER.